United States Patent [19]

Patel et al.

[11] 3,875,260

[45] Apr. 1, 1975

[54] POLYMERIC COMPOSITIONS

[75] Inventors: Pravinkumar Goverdhanbhai Patel, Dunkinfield; Thomas Orr Craig, Mottram, both of England

[73] Assignee: Sterling Moulding Materials, Stabybridge, Cheshire, England

[22] Filed: Dec. 7, 1971

[21] Appl. No.: 205,695

[30] Foreign Application Priority Data
Dec. 17, 1970 Great Britain.................... 60078/70

[52] U.S. Cl. ........................ 260/878 R, 260/880 R
[51] Int. Cl. .............................................. C08f 15/00
[58] Field of Search .................... 260/878 R, 880 R

[56] References Cited
UNITED STATES PATENTS

| 3,488,743 | 1/1970 | Baer et al. .................... 260/878 R |
| 3,538,190 | 11/1970 | Meredith et al. ................ 260/878 R |
| 3,538,192 | 11/1970 | Bishop, Sr. .................... 260/878 R |
| 3,694,522 | 9/1972 | Tsuruta et al. .................. 260/878 R |
| 3,696,172 | 10/1972 | Kaiho et al. .................... 260/880 R |

FOREIGN PATENTS OR APPLICATIONS

| 6,714,754 | 5/1968 | Netherlands.................... 260/880 R |
| 1,495,090 | 1/1969 | Germany......................... 260/880 R |
| 1,002,902 | 9/1965 | United Kingdom............ 260/880 R |
| 6,513,552 | 4/1967 | Netherlands.................... 260/880 R |

OTHER PUBLICATIONS

Encyclopedia of Polymer Science and Technology, Vol. 12, p. 288, Interscience, New York (1970).
ASTM D 1646-63.

Primary Examiner—Joseph L. Schofer
Assistant Examiner—A. Holler
Attorney, Agent, or Firm—Wenderoth, Lind & Ponack

[57] ABSTRACT

A polymer composition, e.g. a high-impact polystyrene, having novel morphological structure comprises a polymeric matrix, e.g. polystyrene, in which there are dispersed particles of a second polymer, e.g. an ethylene-propylene terpolymer. The particles of second polymer contain occlusions of matrix polymer and the occlusions also contain sub-occlusions of a third polymeric species, e.g. polybutadiene, which is more specific to grafting with the monomeric constituents of the matrix polymer than is the second polymer species. The compositions are tough and have good oxidation resistance.

7 Claims, 7 Drawing Figures

EPT-STYRENE CONTINUOUS PHASE

POLYBUTADIENE - STYRENE

- POLYBUTADIENE-STYRENE DROPLET
- EPT-STYRENE CONTINUOUS PHASE
- POLYSTYRENE-STYRENE DROPLET
- COMPOSITE DROPLET OF POLYBUTADIENE-STYRENE ENVELOPED WITHIN POLYSTYRENE-STYRENE

EPT/STYRENE CONTINUOUS PHASE

- POLYSTYRENE-STYRENE CONTINUOUS PHASE
- EPT-STYRENE DROPLET
- POLYSTYRENE-STYRENE OCCLUSION
- POLYBUTADIENE-STYRENE SUB-OCCLUSIONS

1000X PHOTOGRAPH OF SYSTEM AFTER PHASE INVERSION.

POLYMERIC COMPOSITIONS

This invention relates to composite polymeric materials of novel morphological structure, and to a process for producing them.

It is well known that the incorporation of natural or synthetic rubbers in glassy polymers such as polystyrene or styrene copolymers improves the toughness of the latter polymers. It is also well known that by dissolving a natural or synthetic rubber such as polyisoprene, polybutadiene, rubbery copolymers of butadiene and styrene, or of ethylene and propylene, in styrene monomer and then polymerising the solution, graft copolymers can be produced, and that the resulting toughened polymer has a two-phase structure. When the polymerisation is conducted in a suitably agitated reactor, the rubber is dispersed in the polystyrene matrix as particles sized from about $1\mu$ to $20\mu$. The phase changes which occur during such polymerisations are well reported. Furthermore, an explanation has been provided for the formation of occlusions of polystyrene which can be seen within the elastomer particles in a finished high-impact polystyrene composition.

For the preparation of such a composition, for example high impact polystyrene (HIPS), it is usual to dissolve an unsaturated rubber in the polymerisable, monomeric solvent, and to polymerise the solvent by an agitation polymerisation technique. The elastomers employed generally have sufficient unsaturation to ensure that grafting of the elastomer by the polymerising solvent occurs, since it is known that such grafting enhances toughness by providing adhesion between the dispersed elastomer phase and the continuous polystyrene matrix. However, the use of unsaturated elastomers renders the HIPS susceptible to oxidative embrittlement under certain conditions.

Previous attempts in the art to overcome this disadvantage by using saturated elastomers, such as ethylene - propylene rubbers, whilst being successful in providing oxidation resistant types of HIPS have resulted in materials having inferior toughness when compared with HIPS made with an equivalent amount of an unsaturated elastomer.

We have found that it is possible to produce a class of polymeric composition having a novel morphological structure in which elastomer particles within a polymer matrix are occluded and sub-occulded with matrix polymer and other different elastomer particles. These new polymeric compositions exhibit useful and unexpected combinations of properties.

In accordance with this invention there is provided a polymer composition comprising a matrix of a polymer $P_m$ having dispersed therein particles of a polymer $P_s$, said dispersed particles containing occlusions of matrix material, said occlusions containing sub-occlusions of a modified polymer $P_g$, wherein the polymer $P_g$ is more susceptible to grafting with the monomeric constituents of polymer $P_m$ than is polymer $P_s$.

The present invention also provides a process for preparing such a polymer composition, which process comprises:

providing a solution of a first polymer $P_s$ in a monomeric solvent which is polymerisable to polymer $P_m$, said solution containing a dispersed phase of $P_m$ in the solvent, said disperse phase containing occlusions of a modified polymer $P_g$, and effecting polymerisation of the solvent to said polymer $P_m$, the viscosity of the $P_s$ - solvent phase being higher than that of the $P_m$-solvent phase at the moment phase inversion takes place and the $P_m$-solvent phase becomes continuous.

According to one embodiment of the process of the invention the polymer system may be formed by providing a solution of the polymers $P_s$ and $P_g$ in the monomeric solvent. The volume of the $P_g$-solvent phase should be less than that of the $P_s$-solvent phase. Preferably the concentration of polymer $P_g$ is less than that of polymer $P_s$.

The polymer system may also be formed by mixing together a solution of polymer $P_m$ in the monomeric solvent containing a dispersed phase of modified polymer $P_g$ and either a. a solution of the polymer $P_s$ in the monomeric solvent or b. a solution of polymer $P_s$ in the monomeric solvent containing a disperse phase of polymer $P_m$ in the solvent.

In these ways it is possible, for example, to prepare a high impact polystyrene which combines the toughness imparted by an unsaturated elastomer with the oxidation resistance imparted by a saturated elastomer. Furthermore, the HIPS of this invention exhibits better toughness than a HIPS of identical chemical composition made by mechanically blending two species of HIPS, one of which species has been made by a separate polymerisation of a solution of the saturated elastomer in monomer, and the second of which has been made by polymerisation of a solution of the unsaturated elastomer in monomer.

Thus according to a feature of this invention there is provided a polymeric composition comprising a matrix of a homopolymer of a monovinyl or monovinylidene monocyclic aromatic hydrocarbon or a copolymer thereof with at least one other different ethylenically unsaturated monomer, said matrix having dispersed therethrough particles of a saturated elastomer, said saturated elastomer particles containing occlusions of the matrix material, said occlusions being sub-occluded with particles of a modified unsaturated elastomer.

It should be understood that the terms "saturated" and "unsaturated" used herein to describe the elastomers refer to the relative susceptibilities of the elastomers to undergo grafting by the polymerising monomeric solvent.

The novel attributes of HIPS prepared in accordance with this invention are qualitatively compared with the properties of related materials known in the art in the following Table.

| Property | HIPS (A) containing saturated elastomer | HIPS (B) containing unsaturated elastomer | Mechanical blend of (A) & (B) | Novel structure containing the saturated and un- saturated elastomers |
| --- | --- | --- | --- | --- |
| Toughness | Poor | Good | Poor | Good |
| Oxidation resistance | Good | Poor | Fair | Good |

Although a large number of polymers can have the novel morphological structure, the invention is particularly applicable to polymer systems in which the matrix is a polymer of a monovinyl or monovinylidenic hydrocarbon and the invention will be explained in greater detail with reference to a polystyrene - polybutadiene - EPT (Ethylene-Propylene Terpolymer) system in which $P_m$ is polystyrene, $P_g$ is polybutadiene and $P_s$ is EPT. The ethylene-propylene terpolymer will be regarded as being saturated in comparison with the butadiene, since the unsaturated third monomer is present in it to only a minor extent. Thus, EPT contains less than 3 carbon-carbon double bonds per thousand carbon atoms whereas polybutadiene contains 250 carbon-carbon double bonds per thousand carbon atoms.

As applied to the preparation of HIPS, the process of this invention thus involves providing a mixture in which a continuous phase of EPT dissolved in styrene contains a disperse phase of polystyrene in styrene; wherein the disperse phase itself contains a further disperse phase of polybutadiene-styrene, which further disperse phase may optionally contain occlusions of polystyrene in styrene. There are various ways of reaching this system, of which three may be mentioned as follows:

A. The EPT and polybutadiene are dissolved in monomeric styrene and the system subjected to polymerisation conditions. This is the preferred procedure, and is described in more detail below.

B. Instead of dissolving polybutadiene in monomeric styrene (as in A), the polybutadiene may be provided in the form of inclusions in a polystyrene matrix by using a conventional HIPS. This HIPS is added, in proportion to provide the required amount of polybutadiene, to a solution of EPT in styrene, which is then polymerised as before.

C. Instead of adding the conventional HIPS to a solution of EPT in monomeric styrene (as in B), the conventional HIPS may be added to an EPT - styrene that is in the process of polymerisation. The important requirement is that the polystyrene in the EPT-styrene system should be in the disperse phase at the time of addition of conventional HIPS.

The EPT polymers may be prepared in solution using heterogeneous catalysts. Ethylene and propylene are the main constituents in a ratio of about 60 to 40 parts. Small amounts of di-functional monomers are frequently copolymerised such as di-cyclopentadiene or 5-ethylidene-2-norbornene. The Mooney viscosity of EPT may range from 20 - 200. The EPT elastomers are known to possess better ageing properties than the commonly used elastomers in toughened polystyrene or A.B.S.

The polybutadiene rubbers are synthesised using a wide variety of catalysts, such as Ziegler or butyl lithium. The structure is predominantly 1,4 addition but the cis content may differ widely according to the catalysts; from 25 percent to 95 percent, the remainder being trans, with small amounts of the vinyl structure. The Mooney viscosity varies normally between 25 and 70.

The optimum concentration of the EPT polymer is 5-7 percent and of the polybutadiene is 0.5-2 percent. The total content of EPT and polybutadiene preferably should not be less than 4.5 percent by weight of the total solution.

The monovinyl or monovinylidene monocyclic aromatic hydrocarbon is preferably styrene but other hydrocarbons such as vinyl toluene and alphamethyl styrene may be used in admixture with each other or with styrene. Examples of monomers which may be copolymerised with such hydrocarbons are acrylonitriles, vinyl esters of aliphatic monocarboxylic acids and aliphatic or alicyclic esters of monoethylenically unsaturated acids.

Polymerisation of the solution of the rubbers in the monomer or mixture of monomers is preferably initiated by decomposition of one or more free radical precursors chosen in accordance with the temperature at which it is desired to conduct the polymerisation. Such radical precursors as benzoyl peroxide, lauroyl peroxide, tertiary butyl peracetate, di-tertiary butyl peroxide and dicumyl peroxide may be used. A normal concentration range of one of these would be 0.005 - 0.5 percent. The polymerisation may also be initated by the action of heat alone.

The reaction mixture may also contain various chain transfer agents such as tert-dodecyl mercaptan, tert-butylmercaptan or the unsaturated dimer of alpha methyl styrene.

Lubricants such as stearic acid or white mineral oils may be incorporated as is well known in the art. Minor amounts of inert diluents such as ethylbenzene, toluene and diethylbenzene may also be incorporated into the reaction mixture.

The reaction is normally carried out using an agitated mass polymerisation process, at least until 20 percent of the monomer or monomers has polymerised, the reaction temperature during the first step being from 70°C to 140°C. The second step may also be carried out in mass or the reaction may be completed in suspension, by dispersing the mass in water and completing the reaction in the presence of suspension stabilisers, as is well known in the art. The temperature range in the second step of the mass process is normally from 100°C up to 200°C and higher. The suspension process is normally carried out between 90°C and 140°C.

The invention will be further described with reference to the accompanying drawings in which.

The changes which occur during polymerisation and phase inversion may be explained as follows.

The dissolution of 6 percent EPT and 1 percent polybutadiene together in styrene monomer yields a two-phase system (the EPT-polybutadiene content exceeds 4.5 percent of the total solution); when suitably agitated, the system consists of a discrete phase of polybutadiene-styrene droplets dispersed in a continuous phase of EPT-styrene solution as shown in FIGS.

Figure 1A:
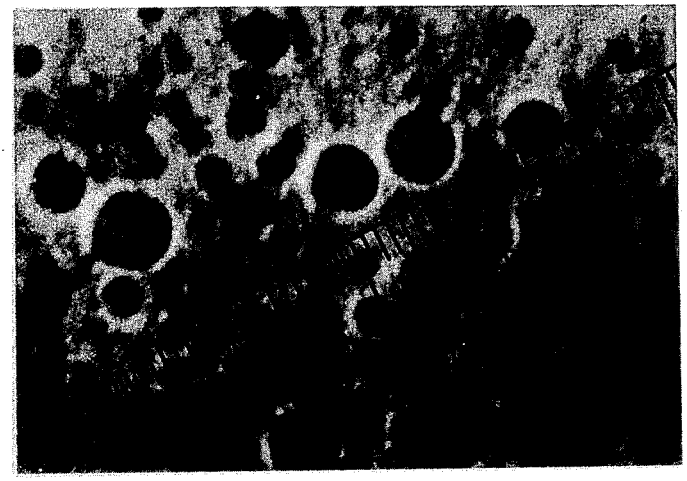
FIG. 1A is a photograph (1000x) of a styrene-EPT-polybutadiene feedstock showing the continuous phase of EPT-styrene and the disperse phase which is droplets of polybutadiene-styrene.
Figure 1B:
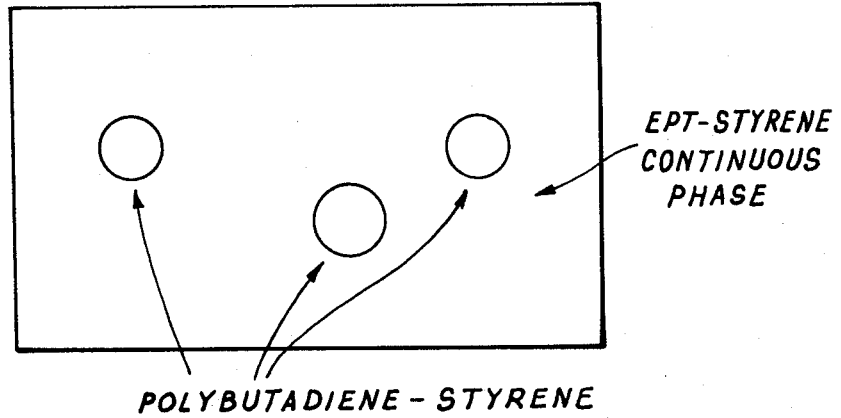
FIG. 1B is an explanatory diagram of the feedstock shown in FIG. 1A.
Figure 2:
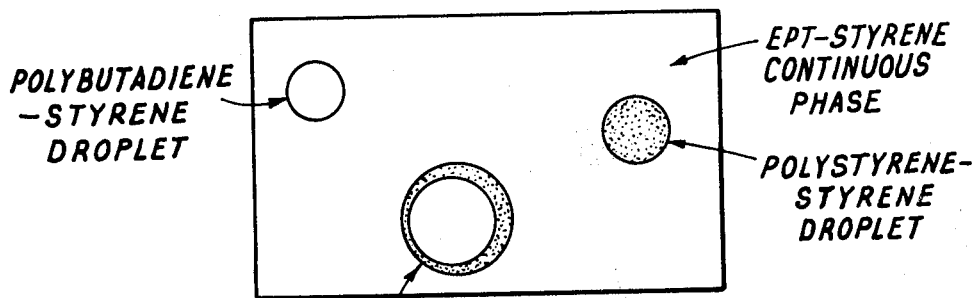
FIGS. 2 and 3 are respectively, an explanatory diagram and photgraph (1000X) showing the morphology of the polymerisation system at about 5% conversion.
Figure 3:
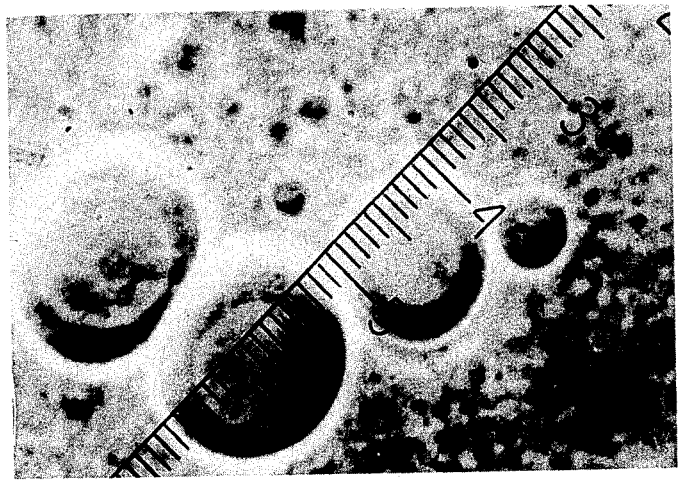

1A and 1B. Polymerisation of such a system leads to the formation of polystyrene, which in an agitated reactor separates as a second discrete phase of polystyrene-styrene solution. The morphology of the system of 5 percent conversion is shown in FIG. 2 and FIG. 3. An unusual feature of the system at this stage of conversion is that some of the polystyrene-styrene droplets contain smaller droplets of what appear from their refractive index to be polybutadiene-styrene solution. This phenomenon is shown diagrammatically in FIG. 3. The occurrence of such morphology can be rationalised as follows.

During polymerisation of the styrene monomer, growing polystyryl radicals undergo chain transfer with polybutadiene and hence grafting of polystyrene to polybutadiene takes place. The EPT, on the other hand, presents a structure which is less susceptible to grafting. All polybutadiene-styrene droplets will consequently, after a time, contain some amount of a second polymeric species, namely poly(styrene-g-butadiene). This species, like the non-grafted polybutadiene, will also be incompatible with the continuous EPT-styrene phase.

Figure 4:
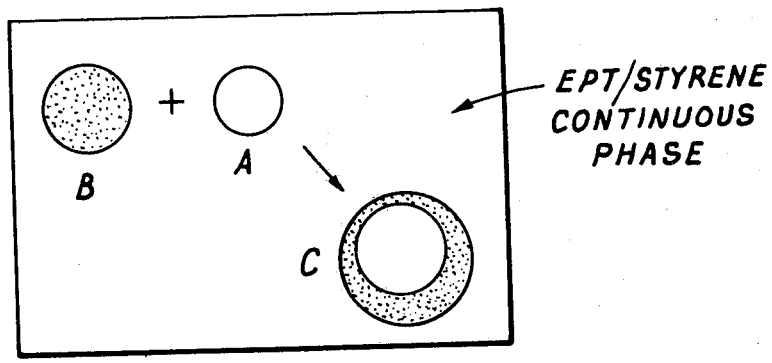
FIG. 4 is a diagram schematically representing the formation of a polybutadiene-styrene occlusion within a polystyrene-styrene droplet.

Consider a polybutadiene-styrene droplet, marked A in FIG. 4, which will contain poly(styrene-g-butadiene). The interface between such a droplet and the EPT-styrene continuous phase in which it is suspended is characterised by an interfacial tension, $T_{B/EPT}$; if the polybutadiene-styrene droplet were relocated within a polystyrene-styrene droplet the resultant interfacial tension at its surface, $T_{B/PS}$, would be lower than $T_{B/EPT}$, since the grafted species present in the polybutadiene-styrene droplet would now have their polystyrene segments arrayed in a compatible environment. We have observed that collision of a polystyrene-styrene droplet with a polybutadiene-styrene droplet leads to the latter being enveloped by the former, thereby generating the arrangement of phases shown in FIG. 2 and FIG. 3. This phenomenon, encountered in a real polymerisation, can be observed also in agitated simulations of partially polymerised system at e.g. 5 percent conversion. These systems are generated by mixing polystyrene, polybutadiene, EPT and styrene monomer in the requisite proportions until all the polymers dissolve. Small amounts of styrene-butadiene block copolymers may be added to fill the same role as poly(butadiene-g-styrene) in a polymerising system. We have observed qualitatively in such simulated low conversion samples that, other things being equal, the population of composite particles (structure C in FIG. 4) formed increases with increasing concentration of added styrene-butadiene block copolymer.

Figure 5:
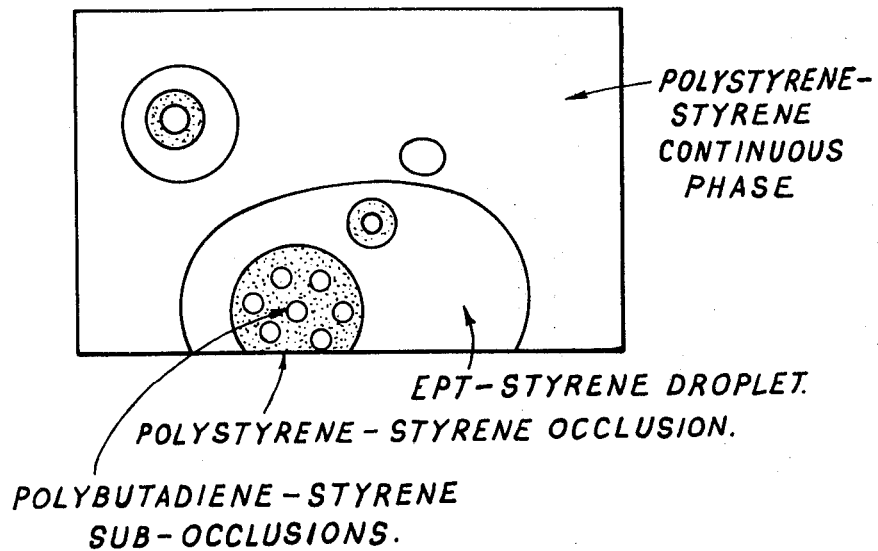
FIGS. 5 and 6 are respectively an explanatory diagram and a photograph (1000X) showing the morphology of the system after phase inversion.
Figure 6:
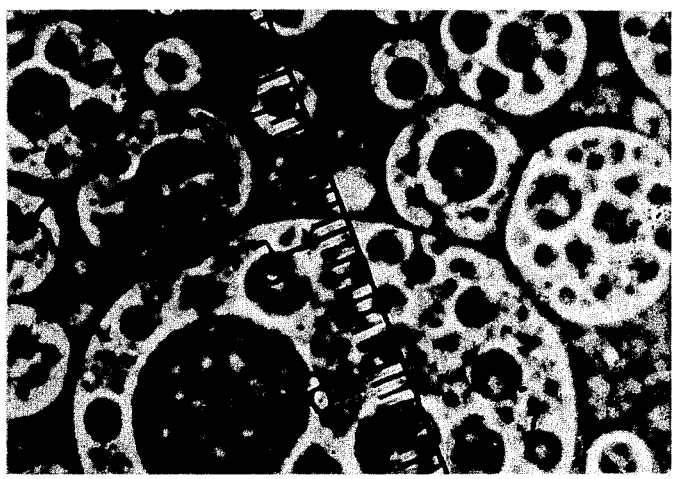

After phase inversion with respect to the EPT-styrene solution, i.e., when the amount of styrene polymerised is sufficient for the condition volume of polystyrene-styrene phase/volume of EPT-styrene phase = 1 to be exceeded, the following events are observed. Areas of the EPT-styrene solution begin to undergo dispersion to form the discrete phase, but due to the viscosity of the EPT-styrene solution, some polystyrene-styrene droplets are trapped within it and are thus prevented from becoming part of the incipient continuous phase. However, some polystyrene-styrene droplets contain polybutadiene-styrene within them as described above. As a result of this state, established prior to phase inversion, the composite fluid system now has the morphology shown in FIG. 5 and FIG. 6.

The invention will be illustrated by the following Examples.

EXAMPLE 1

Procedure (a)

1,288 grams of styrene monomer, together with 84 grams of EPT elastomer [a terpolymer of ethylene and propylene with 3-4 percent ethylidene norbornene having a Mooney viscosity (ML 1+4 at 100°C) of 60-65] and 14 grams of the polybutadiene [Mooney viscosity (ML 1+4 at 100°C) of 45] shown in the Table were charged to a 2-litre flask fitted with a reflux condenser, thermometer, nitrogen inlet and an anchor type impeller. The contents of the flask were agitated at 120 rpm until no dissolved material remained. A catalyst combination consisting of 0.7 grams tertiary-butyl peracetate, 0.28 grams di-tertiary-butyl peroxide and 0.07 grams dicumyl peroxide dissolved in 14 grams mineral oil was added. The mixture was heated at 92°C for 3 hours, 95°C for 6 hours, 105°C for 6 hours and 180°C for 6 hours. Agitation at 120 rpm was maintained until microscopy of samples withdrawn from the mixture indicated that the polystyrene-styrene solution had become the continuous phase whereupon 0.14 of n-lauryl mercaptan was added and the mixture transferred into glass screw-cap bottles, 5 inches tall and 1½ inches diameter; polymerisation was then completed according to the above temperature cycle in an oil-bath. The polymer billets were granulated and injection moulded. The resulting composite polymeric structure had a high impact strength as measured by the Izod test, and when examined under an electron microscope at 2,000× showed the novel morphology.

By way of comparison, a polymeric composite material was prepared in such a manner as to have the same chemical composition as the material prepared by Procedure (a) but lacking the novel morphology. This latter polymeric material was prepared as follows:

Procedure (b)

A solution of 7 percent by weight of the same EPT elastomer as used in Procedure (a) was prepared in styrene monomer, and then polymerised using the same catalyst system, agitation regime and temperature cycle as given under Procedure (a).

A solution of 7 percent by weight of the same polybutadiene as used in Procedure (a) was prepared in styrene and then polymerised under the conditions of Procedure (a).

The polymers resulting from these two reactions were separately granulated and then thoroughly mixed together in the requisite proportions using a Hobart blender to yield a dry blend containing 6 percent EPT and 1 percent polybutadiene. This dry blend was then injection moulded and tested for physical properties.

The properties of a set of polymers made in the manner described above are given in Table 1. Polymers P-71, P-70, P-73 and P-83 were made by Procedure (a) and all have the novel structure described above; they are pairs of replicate runs made to indicate repeatability. Run P-80 contains 7 percent EPT rubber only, while run P-82 contains 7 percent polybutadiene. A physical blend of these polymers was made to provide a comparison between polymers having the same chemical composition, but not both having the novel phase structure described above. Thus, Table 1 shows the properties of a 6/1 blend of P-80 with P-82 which may be compared with the properties of P-73 and/or P-83. The improved impact strength of the polymer containing the novel structure is evident, in comparison with the impact strength of the polymer having the same chemical composition but lacking the novel morphology. Furthermore, Table 1 indicates that the polymer containing 6 percent of the oxidation resistant, saturated elastomer, present as part of the novel structure has an impact strength as good as that of the polymers containing the less oxidation resistant polybutadiene.

Table 3

Property Retention upon Oven Ageing

|  | Polymer from Example 2 | Commercial Polymer |
|---|---|---|
| % Elongation at break | 30 | 18 |
| % Elongation at break after ageing | 31 | 8 |

Table 1

| Polymer No. | P-71 | P-70 | P-73 | P-83 | P-80 | P-82 | 6:1 Blend of P-80/P-82 |
|---|---|---|---|---|---|---|---|
| % EPT | 6 | 6 | 6 | 6 | 7 | — | 6 |
| % polybutadiene | 1 | 1 | 1 | 1 | — | 7 | 1 |
| Type of Polybutadiene | 55 | 55 | 45 | 45 | — | 45 | 45 |
| % Elongation | 10 | 18 | 16 | 19 | 6 |  | 10 |
| Yield Strength PSI | 5600 | 5090 | 5280 | 5250 | 5900 |  | 6000 |
| Ult. Strength PSI | 5240 | 4540 | 4640 | 4800 | 5150 |  | 5150 |
| Izod Impact Strength ft. lbs/in. notch | 1.6 | 1.8 | 1.5 | 2.0 | 0.7 | 1.8 | 1.1 |

EXAMPLE 2

The apparatus described in Example 1 was charged with the following: 1,288 grams of styrene monomer, 14 grams of the polybutadiene of Example 1, and 84 grams of an EPT rubber designated Intolan 140A. Agitation was maintained till no rubber remained undissolved. As internal lubricants, 21 grams of Shell Risella oil and 1.4 grams of zinc stearate were added, followed by a catalyst which consisted of 1.19 grams of di-tert-butyl peroxide. The mixture was heated with agitation at 120 rpm for 4.5 hours at 96°C. When polystyrene-styrene had become the continuous phase (as shown by microscopy of samples), 1.4 grams of 1,2-dimethyl-1,2-diethyl-1,2-diphenylethane and 0.14 grams of lauryl mercaptan were added. At the end of the 4.5 hour period, the mass was transferred into 4-ounce bottles and heated as follows: 6 hours at 110°C, 6 hours at 120°C, 6 hours at 130°C, 6 hours at 180°C and 0.25 hours at 280°C. The product was cooled, granulated and injection moulded. The properties are shown in Table 2. To demonstrate the superior retention of toughness of the material upon ageing, a commercially available impact polystyrene made using approximately 7 percent by weight of polybutadiene was taken, moulded, and the test pieces exposed in an air oven at 70°C for 14 days together with those from the material made in Example 2. A comparison between the polymers of this invention and the commercial polybutadiene modified HIPS are set forth in Table 3.

Table 2

Properties of Example 2 Polymer

| Elongation % at break | Tensile Yield Strength PSI | Ultimate Tensile Strength PSI | Izod Impact Strength (Ft. lbs/in. notch) |
|---|---|---|---|
| 30 | 4400 | 4160 | 1.8 |

EXAMPLE 3

The apparatus described in Example 1 was charged with 1288 grams of styrene, 14.0 grams of the polybutadiene of Example 1, 14 grams of Shell Risella oil, and 84 grams of EPT rubber, Nordel 1040 (a product of Du Pont). Nordel 1040 is a rubbery terpolymer of approximately equimolar amounts of ethylene and propylene, together with 3–4 wt percent of hexa-1,4-diene; it has a Mooney viscosity (ML 1+4) at 121°C of 40. The vessel contents were agitated till no more rubber remained undissolved. The temperature was raised to 95°C and 1.26 grams of di-tert.-butyl peroxide added. Agitation was maintained at 120 rpm. The temperature cycle followed was: 4.25 hours at 95°C, 6 hours at 110°C, 6 hours at 120°C, 6 hours at 130°C, 5.25 hours at 180°C and 0.25 hours at 280°C. When the polystyrene-styrene phase had become continuous, 1.4 grams of 1,2-dimethyl-1,2-diethyl-1,2-diphenylethane and 0.14 grams lauryl mercaptan were added. At the end of the initial 4.25 hour period the polymerising mass was poured into 4 ounce bottles for the remainder of the polymerisation cycle. The final product was granulated and injection moulded and had the properties: Izod impact strength 1.3 ft. lbs/in. notch, 3,960 psi tensile yield strength, 3,920 psi tensile strength at break, elongation at break 33 percent.

EXAMPLE 4

The procedure of Example 3 was used to polymerise a system prepared by dissolving 14 grams of polybutadiene (Intene 45) and 84 grams of Esso Vistalon 6505 rubber 1288 grams of styrene. Vistalon 6505 is a rubbery terpolymer of ethylene and propylene in approximately equimolar proportions together with 9–12 percent of ethylidene norbornene. It has a Mooney viscosity (ML 1+8 at 127°C) of 50. The resulting polymer had the following properties: Izod impact strength (ft. lbs/in. notch) 1.5 tensile yield strength (psi) 3600, ultimate tensile strength (psi) 4240, elongation at break (percent) 26.

Although the Examples here presented have been confined to the polystyrene-polybutadiene-EPTstyrene system, the number of such systems which may be generated is large, since the conditions necessary for their creation are:

a. monomer or monomers ($M_1$, $M_2$ . . . . . . . . . . . . . . . . . $M_j$) in which all polymeric species (both initially present and subsequently generated) are soluble under the experimental conditions, b. a polymeric substrate, $P_g$, capable of being grafted by the polymerising monomer(s), c. a second polymeric substrate, $P_s$, which is not susceptible to grafting under the experimental conditions, or is substantially less susceptible than $P_g$, d. that the volume of the $P_g$-monomer(s) phase be less than the volume of the $P_s$-monomer(s) phase. Under these conditions it may be found that small amounts of the polymer $P_g$ are present in the $P_s$-monomer(s) phase, or vice versa, and e. that the viscosity of the $P_s$-monomer(s) solution at phase inversion be higher than the viscosity of the solution of polymer or interpolymers formed from monomer(s) $M_1$, $M_2$ . , . . . . . . . . . . . .$M_j$ in those monomer(s).

Clearly these requirements can be met by a large number of combinations of materials.

We claim:

1. A process for the production of a polymer composition comprising a matrix of polystyrene having disposed therein particles of an ethylene-propylene terpolymer (EPT) having a Mooney Viscosity of from 20 to 200, said dispersed particles containing occlusions of matrix material, said occlusions containing subocclusions of a modified polybutadiene having a Mooney Viscosity (ML 1 + 4 at 100°C) of from 25 to 70, which process comprises providing a solution of EPT having a Mooney Viscosity of from 20 to 200 and polybutadiene having a Mooney Viscosity (ML 1 + 4 at 100°C) of from 25 to 70 in monomeric styrene, the concentrations of EPT and polybutadiene being from 5 to 7 percent and from 0.5 to 2 percent by weight, respectively, based on the weight of the total composition and the volume of the polybutadiene-styrene phase being less than that of the EPT-styrene phase and effecting polymerization by an agitated mass polymerization technique until at least 20 percent of the styrene has polymerized and thereafter completing the polymerization either in mass or in a suspension in water.

2. A polymer composition comprising a matrix of polystyrene having dispersed therein particles of an ethylene-propylene terpolymer having a Mooney Viscosity of from 20 to 200, said dispersed particles containing occlusions of polystyrene, said occlusions containing sub-occlusions of a modified polybutadiene having a Mooney Viscosity (ML 1 + 4 at 100°C) of from 25 to 70 and, said modified polybutadiene being more susceptible to grafting with a styrene monomer than is the ethylene-propylene terpolymer.

3. A process for the production of a polymer composition comprising a matrix of polystyrene having dispersed therein particles of an ethylene-propylene terpolymer having a Mooney Viscosity of from 20 to 200, said dispersed particles containing occlusions of polystyrene, said occlusions containing sub-occlusions of a modified polybutadiene having a Mooney Viscosity (ML 1 + 4 at 100°C) of from 25 to 70 and, said modified polybutadiene being more susceptible to grafting with a styrene monomer than is the ethylene-propylene terpolymer, which comprises providing a solution of an ethylene-propylene terpolymer having a Mooney Viscosity of from 20 to 200 in a styrene monomer solvent which is polymerizable to polystyrene, said solution containing a disperse phase of polystyrene in the solvent, said disperse phase containing occlusions of a modified polybutadiene polymer having a Mooney Viscosity (ML 1 + 4 at 100°C) of from 25 to 70, and effecting the polymerization of the monomeric styrene solvent to polystyrene.

4. A process according to claim 3 wherein the solution is formed by providing a solution of the ethylene-propylene terpolymer and modified polybutadiene in the monomeric styrene solvent, the volume of the modified polybutadiene-solvent phase being less than that of the ethylene-propylene terpolymer-solvent phase, and effecting the polymerization of the styrene monomer to polystyrene.

5. A process according to claim 3 wherein the solution is formed by mixing together
   1. a polystyrene polymer containing inclusions of the said modified polybutadiene polymer, and
   2. a solution of the said ethylene-propylene terpolymer in the monomeric styrene solvent.

6. A process according to claim 3 wherein the solution is formed by mixing together
   1. a polystyrene polymer containing inclusions of the said modified polybutadiene, and
   2. a solution of the said ethylene-propylene terpolymer in the monomeric styrene solvent containing a disperse phase of polystyrene in the styrene solvent.

7. A process according to claim 3 wherein the ethylene propylene terpolymer is present in an amount of from 5 to 7 percent by weight, based upon the weight of the total composition and the modified polybutadiene is present in an amount of from 0.5 to 2 percent by weight of the total composition.

* * * * *